(12) United States Patent
Stein

(10) Patent No.: US 10,551,061 B2
(45) Date of Patent: Feb. 4, 2020

(54) IMPLOSION REACTOR TUBE

(71) Applicant: Donald Joseph Stein, Sony Plain (CA)

(72) Inventor: Donald Joseph Stein, Sony Plain (CA)

( * ) Notice: Subject to any disclaimer, the term of this patent is extended or adjusted under 35 U.S.C. 154(b) by 145 days.

(21) Appl. No.: 15/313,249

(22) PCT Filed: May 25, 2015

(86) PCT No.: PCT/CA2015/000341
§ 371 (c)(1),
(2) Date: Nov. 22, 2016

(87) PCT Pub. No.: WO2015/176170
PCT Pub. Date: Nov. 26, 2015

(65) Prior Publication Data
US 2017/0138593 A1    May 18, 2017

(30) Foreign Application Priority Data
May 23, 2014    (CA) ...................................... 2852460

(51) Int. Cl.
| F23D 14/02 | (2006.01) |
| F23G 5/32 | (2006.01) |
| B01J 19/26 | (2006.01) |
| B01J 3/08 | (2006.01) |
| F23C 99/00 | (2006.01) |
| F23G 7/00 | (2006.01) |
| F23G 7/06 | (2006.01) |

(Continued)

(52) U.S. Cl.
CPC ................. *F23G 5/32* (2013.01); *B01J 3/08* (2013.01); *B01J 19/26* (2013.01); *F23C 3/002* (2013.01); *F23C 15/00* (2013.01); *F23C 99/005* (2013.01); *F23D 14/02* (2013.01); *F23G 7/008* (2013.01); *F23G 7/05* (2013.01); *F23G 7/06* (2013.01); *F23R 7/00* (2013.01); *F23C 2205/00* (2013.01); *F23C 2900/03004* (2013.01); *F23C 2900/03005* (2013.01); *F23C 2900/03009* (2013.01); *F23C 2900/99005* (2013.01); *F23D 2210/00* (2013.01); *F23D 2900/14701* (2013.01); *F23G 2200/00* (2013.01); *F23G 2202/30* (2013.01); *F23G 2202/40* (2013.01); *Y02E 20/12* (2013.01)

(58) Field of Classification Search
CPC ........................................................ F23B 7/10
USPC ........................................................ 422/126
See application file for complete search history.

(56) References Cited

U.S. PATENT DOCUMENTS 3,730,093 A * 5/1973 Cummings ............. F42B 12/44
                                                                102/363
3,994,665 A * 11/1976 Young ....................... F23C 9/00
                                                                431/116

(Continued)

FOREIGN PATENT DOCUMENTS

CA    1263058 A    11/1989

*Primary Examiner* — Nina Bhat

(57) ABSTRACT

An implosion reactor tube is provided, including: a receptacle body having a tube shape open at a first end; a cylinder positioned within the receptacle body; a mixing chamber at a second end of the receptacle body; the mixing chamber defined by a baffle; the baffle having a plurality of inner passages proximate to the cylinder allowing fluid passage through the baffle and a plurality of outer passages proximate to the receptacle body allowing passage of air and fuel through said baffle; a fuel and air inlet for allowing the air and fuel to enter the mixing chamber; and a flash igniter for igniting the air and fuel.

15 Claims, 2 Drawing Sheets

(51) Int. Cl.
    *F23G 7/05*     (2006.01)
    *F23C 3/00*     (2006.01)
    *F23C 15/00*     (2006.01)
    *F23R 7/00*     (2006.01)

(56) References Cited

U.S. PATENT DOCUMENTS

| | | | |
|---|---|---|---|
| 4,291,669 A | | 9/1981 | Herne, Jr. |
| 4,369,100 A | * | 1/1983 | Sawyer .................... B01J 19/10 |
| | | | 204/157.42 |
| 4,743,195 A | * | 5/1988 | Hodate .................... F23B 7/00 |
| | | | 110/245 |
| 4,830,605 A | | 5/1989 | Hodate et al. |
| 5,321,327 A | * | 6/1994 | Jensen .................... G21D 7/02 |
| | | | 310/10 |
| 5,359,966 A | * | 11/1994 | Jensen .................... F23C 3/006 |
| | | | 122/17.1 |
| 7,428,896 B2 | * | 9/2008 | Eriksson ................ F02M 27/02 |
| | | | 123/538 |
| 2003/0110774 A1 | * | 6/2003 | Saitoh .................... F23D 14/70 |
| | | | 60/737 |

\* cited by examiner

IMPLOSION REACTOR TUBE

CROSS-REFERENCE TO RELATED APPLICATIONS

The present utility application is the National Phase filing under 35 U.S.C. 371 of the Canadian Application No.: 2,852,460, filed 23 May 2014, and International Application No.: PCT/CA2015/000341, entitled "IMPLOSION REACTOR TUBE", filed 2015 May 25.

FIELD OF THE INVENTION

The invention pertains generally to a device for elimination of toxic feedstock materials. More specifically, the invention relates to an energy device that can use refined carbon based fuel waste or toxic carbon based materials as a feedstock, and burn and implode the feedstock.

BACKGROUND OF THE INVENTION

Toxic wastes from the oil and gas industry or other sources are often burned off; however this is an expensive means of removing these wastes and often creates pollutants. Generally speaking, as an example, conventional steam boilers used for power generation require high grade feedstock which are highly pollutant and result in high operating costs.

SUMMARY OF THE INVENTION

The reactor tube according to the invention includes a reactor tube forming a receptacle body, which is provided with an air and feedstock fuel supply through a baffle and from a mixing chamber, and with a choke tube or solid rod to create an implosion reaction. The baffle can have various configurations of slots or holes to enable a vortex action to take place within the reactor tube. The vortex motion within the tubular body creates an open ended atmospheric seal within the tubular body which allows for an implosion state to occur within.

The implosion reaction reduces the feedstock material, for example toxic liquids, exhaust gases, sulfur gas and/or biowaste materials to near zero matter converting the energy into heat energy.

An implosion reactor tube is provided, including: a receptacle body having a tube shape open at a first end; a cylinder positioned within the receptacle body; a mixing chamber at a second end of the receptacle body; the mixing chamber defined by a baffle; the baffle having a plurality of inner passages proximate to the cylinder allowing fluid passage through the baffle and a plurality of outer passages proximate to the receptacle body allowing passage of air and fuel through said baffle; a fuel and air inlet for allowing the air and fuel to enter the mixing chamber; and a flash igniter for igniting the air and fuel.

The cylinder may be solid or hollow, and if hollow, may be configured to receive fuel destined for the mixing chamber or to pass material through the receptacle body.

The inner passages and outer passages may angled to direct the air and fuel passing therethrough at an angle to an axis of the receptacle body, and the angles of the inner and outer passages may be the same. The inner and outer passages may be configured to cause the air and fuel passing through them to spiral along the receptacle body.

Feedstock may be fed into the receptacle body through a feedstock inlet outside of the mixing chamber. The reactor may include a silencer at the first end of the receptacle body.

DETAILED DESCRIPTION

Figure 1:
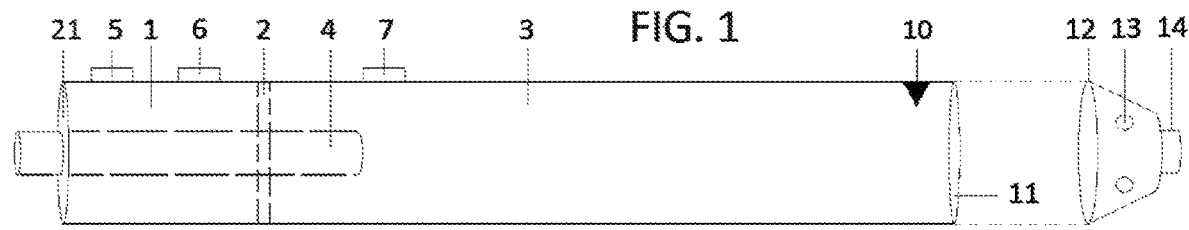
FIGS. 1-3 are side views of an embodiment of a reactor according to the invention, showing some internal components thereof, showing a cylinder in different positions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

With reference to the drawings and, in particular, with reference to FIGS. 1-3 and 7, the implosion reactor includes receptacle body 3, which may be fabricated as an integral molding of an high temperature material, such as an nickel alloy steel, stainless steel, ceramic or quartz crystal material. Receptacle body 3 defines a tube that is open at a first end 11, and a sealed mixing chamber at the opposite second end 21. The length of receptacle body 3 may have a minimum ratio of 10 times the diameter of receptacle body 3 as measured from baffle 2; however other ratios of length to diameter may be used.

Figure 3:
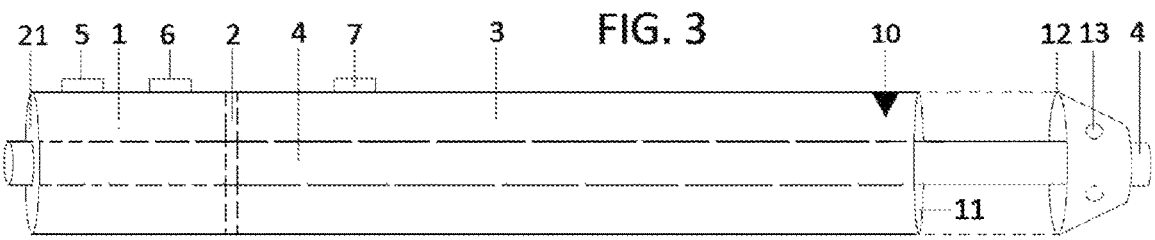
Figure 4:
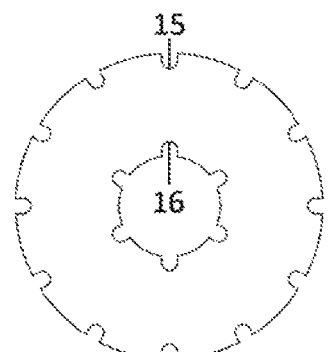
FIG. 4 is a front view of an embodiment of the baffle according to the invention.
Figure 5:
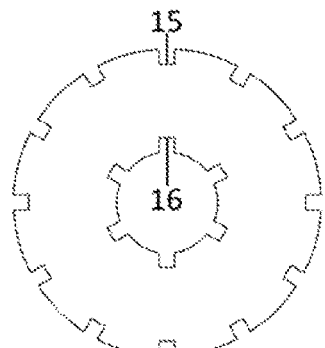
FIG. 5 is a front view of an alternative embodiment of the baffle according to the invention.
Figure 6:
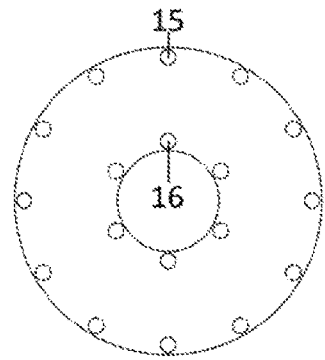
FIG. 6 is a front view of an alternative embodiment of the baffle according to the invention.
Figure 7:
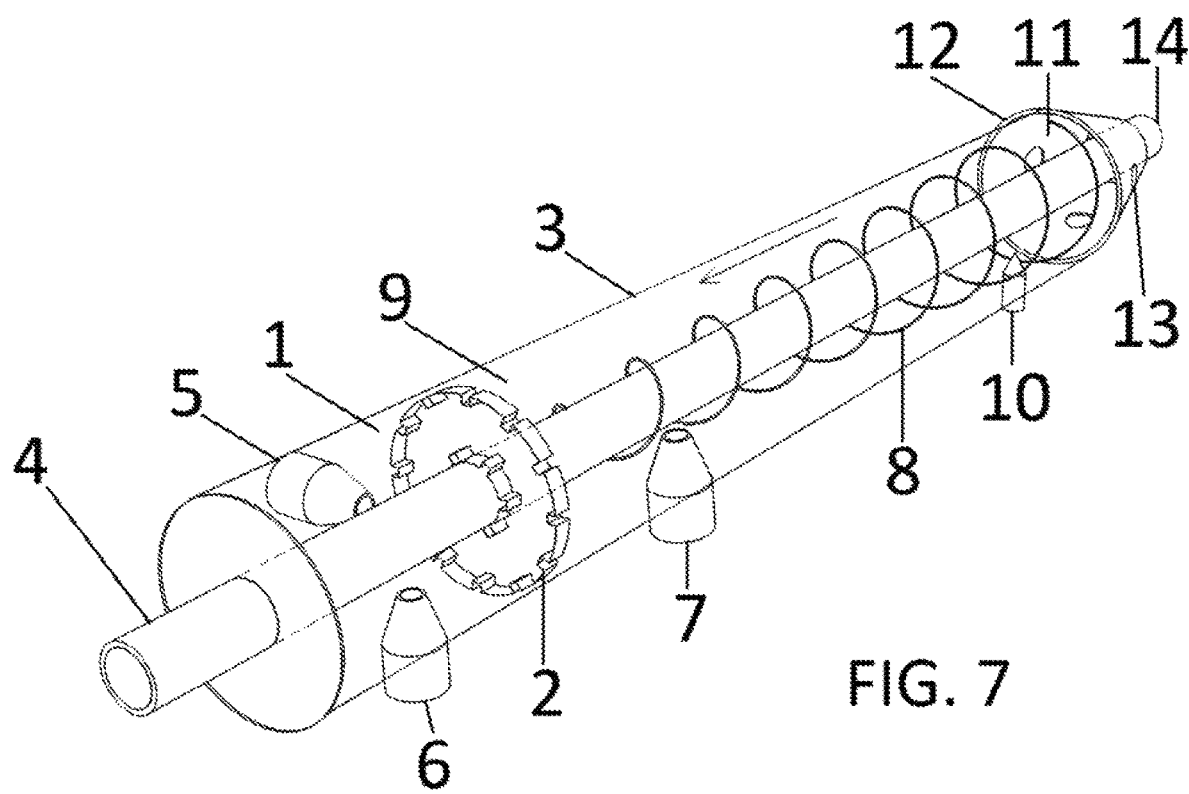
FIG. 7 is a perspective view of an embodiment of a reactor tube and internal components according to the invention.
Figure 8:
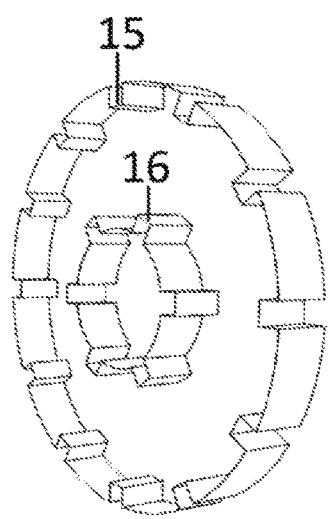
FIG. 8 is a perspective view of an embodiment of the baffle according to the invention.
Figure 9:
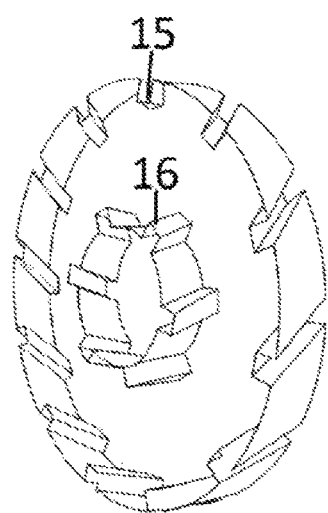
FIG. 9 is a perspective view of an alternative embodiment of the baffle according to the invention.
Figure 10:
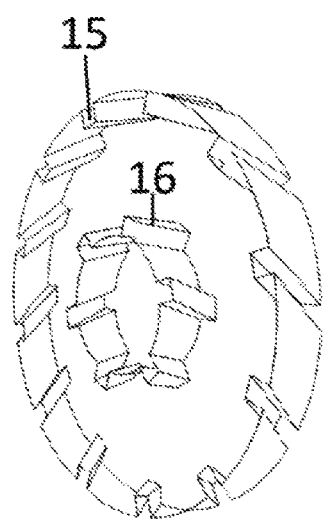
FIG. 10 is a perspective view of an alternative embodiment of the baffle according to the invention.

As depicted in FIGS. 4 to 6, baffle 2 defines a plurality of outer passages 15 and inner passageways 16. Twelve outer passages 15 and six inner passages 16 are shown although more or less may be present. Passages 15, 16 may vary in shape and dimension and pass through baffle 16. Passages 15, 16 may be angled, as shown in FIGS. 8 and 9 with respect to the axis of receptacle body 3. With further reference to FIGS. 3 to 5, passages 15, 16 may be shaped in circular, oval or straight grooves, and may be fabricated as an integral molding of a high temperature material, preferably a nickel alloy steel or ceramic. The outside an inside edges of the baffle 2 form an imperfect seal with the inner surface of the body 3 and cylinder 4 respectively.

As shown in FIG. 1, mixing chamber 1 within reactor tube 3, receives fuel and air as feedstock from air inlet 5 and feedstock inlet 6, respectively. The fuel inlet and air inlets 5, 6, provide fuel and air for both starting the reaction and continuing the process. Cylinder 4 may be positioned centrally with respect to the axis of receptacle body 3 and extends from outside of mixing chamber 1 and through baffle 2, thereby forcing the air and fuel to move around cylinder 4 and assist the creation of vortex 8.

Figure 2:
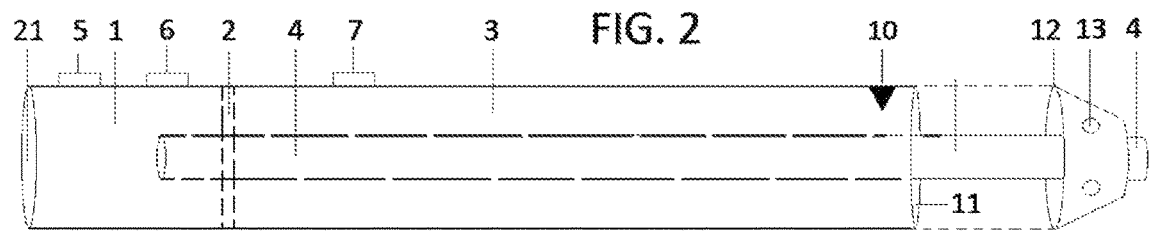

As shown in FIG. 2, mixing chamber within reactor tube 3, receives fuel and air as feedstock from air inlet 5 and feedstock inlet 6, respectively. The fuel inlet and air inlets 5, 6, allow for both starting the reaction and continuing the process, and may be turned off or, in an embodiment of the invention, reduced as an additional feed stock may be introduced into mixing chamber 1 via the cylinder 4, which may be fed from silencer 12.

As shown in FIG. 3, mixing chamber within reactor tube 3, receives fuel and air as feedstock from air inlet 5 and feedstock inlet 6, respectively. The fuel inlet and air inlets 5, 6, allow for both starting the reaction and continuing the process. Cylinder 4, in this embodiment, extends entirely through reactor tube body 3. In this embodiment, material may be fed through cylinder 4 to pass through reactor tube body 3 to a destination. For example, water may enter cylinder 4 and be converted to dry steam as the water flow passes through reactor tube body 3.

Cylinder 4 may be hollow and thereby allow the passage of fuel or other materials into or through reactor tube 3, or may be solid.

As shown in FIGS. 1 through 3 and 7, flash igniter 10 is positioned proximate to first end 11 of reactor tube 3 and is used to start the burning of the air and fuel mixture.

Silencer 12 may be used to reduce noise. The body of the silencer 12, may be threaded, welded or clamped to reactor tube body 3. Silencer 12 may include one or more inlets 13 and is not limited to any particular shape to allow atmospheric air to be vented inwards. Silencer 12 may include insert 14 made of a non conducting material. Insert 14 neutralizes electromagnetic energy formed in tube 3 (as an electromagnetic enegy field may be produced in and caps reactor tube 3 with an imperfect seal.

The present invention provides an implosion reactor in the form of a receptacle including a means of creating a vortex 8, the vortex producing an atmospheric seal that is required to create an implosion state. As shown in FIGS. 1 through 3 and 7, a mixture of air and flammable gas are introduced into the mixing chamber 1 through insert nozzles 5, 6 at pressure, for example fifteen psi but not limited to any specific pressure. This mixture of gas and air then travels through passages 15, 16 in baffle 2 and travels up the length of reactor tube 3. The mixture of flammable gas and air are then ignited by the spark igniter or pilot light 10. A combustion flame is created with an outward reaction from the chamber tube open end 11. An increase of air and flammable gas pressure is applied and a backwards vortex motion is initiated 8. A vacuum state is initiated within the open tube and a ionization phase is achieved prior to plasma reaction state 9.

This process allows for the implosion reaction to create heat energy with the reactor tube 3 and cylinder 4 absorbing the resultant transfer of energy. The feedstock can be eliminated with near zero emission matter in the conversion to heat energy and a plasma state is created without the use of electricity. The implosion reactor process allows for the reactor to produce heat energy for the production of boiler steam energy.

The reactor tube and process according to the invention possesses numerous benefits and advantages over known energy creating processes, such as nuclear, coal and natural gas. In particular, the invention can use feedstock such as toxic biowaste, low grade carbon (petroleum coke or coal), sour gas, sulfur oxide flare gas or simply industrial exhaust. For example, existing electric power plants may use the implosion reactor according to the invention as a heating source, thereby affording component placement flexibility as well as user cost reductions. Another example is the use of the implosion reactor according to the invention in the recovery of oil and gas at the wellhead where toxic flare gas is used as a feedstock to produce steam for down hole production. As another example, the implosion reactor according to the invention can be used as emission scrubbers by using toxic gas emissions from sour gas wells, coal or petroleum coke power stations or gas and oil refineries.

Moreover, the implosion reactor may produce heat energy in the form of steam. Because of its flexibility and simplicity in use and installation, the implosion reactor of the invention realizes a reduction in fuel energy consumption, tooling, operational costs and in the costs of ongoing maintenance.

A practical example of the flexibility possessed by the invention resides in its ability to allow multiple feedstock material to be used to produce the implosion energy. For instance, user specifications may demand that the steam production process use expensive refined fuel for feedstock and are subject to additional costs for pollution to meet environmental regulations.

In addition to the foregoing attributes, the implosion reactor possesses numerous other energy and mechanical benefits over conventional devices. Design features of the reactor tube include no moving parts and that it may be adapted into existing electric power plants. Furthermore, the radiation concerns that are associated with the nuclear process are eliminated with the present invention.

Similarly, the mechanical features of the implosion reactor enable it to tolerate more extreme environments, as previously discussed, liberate it from the specialized installation and maintenance protocols required by conventional energy producing systems.

It can thus be seen that the present invention provides a novel which successfully integrates a next generation energy producing system, and which supersedes present environmental regulations, and reduce the use of conventional fuels and nuclear energy.

Although the particular preferred embodiments of the invention have been disclosed in detail for illustrative purposes, it will be recognized that variations or modifications of the disclosed apparatus lie within the scope of the present invention.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form.

The embodiments of the invention in which an exclusive property or privilege is claimed are defined as follows:

1. An implosion reactor tube comprising:
  a. a receptacle body having a tube shape open at a first end;
  b. a cylinder positioned within the receptacle body;
  c. a mixing chamber at a second end of the receptacle body; the mixing chamber defined by a baffle; the baffle having a plurality of inner passages proximate to the cylinder allowing fluid passage through the baffle and a plurality of outer passages proximate to the receptacle body allowing passage of air and fuel through said baffle;
  d. a fuel and air inlet for allowing the air and fuel to enter the mixing chamber; and
  e. a flash igniter for igniting the air and fuel to produce a vortex within said tube permitting implosion between the air and fuel.

2. The reactor of claim 1 wherein the cylinder is solid.

3. The reactor of claim 1 wherein the cylinder is hollow.

4. The reactor of claim 3 wherein the cylinder is configured to receive fuel destined for the mixing chamber.

5. The reactor of claim 3 wherein the cylinder is configured to pass material through the receptacle body.

6. The reactor of claim 1 wherein the inner passages are angled to direct the air and fuel passing therethrough at an angle to an axis of the receptacle body.

7. The reactor of claim 2 wherein the outer passages are angled to direct the air and fuel passing therethrough at an angle to an axis of the receptacle body.

8. The reactor of claim 3 wherein the angle of the outer passages and the angle of the inner passages is the same.

9. The reactor of claim 1 wherein feedstock is fed into the receptacle body through a feedstock inlet outside of the mixing chamber.

10. The reactor of claim 1 further comprising a silencer at the first end of the receptacle body.

11. The reactor of claim 1 wherein the inner and outer passages are configured to cause the air and fuel passing through them to spiral along the receptacle body.

12. A method of producing a sealed and induced plasma gas field comprising:
  providing a sealed mixing chamber within a receptacle body;

supplying a mixture of air fuel to the mixing chamber near a first end of the receptacle body;
passing the air and fuiel mixture through a baffle towards a first end of the receptacle body;
igniting the air and fuel mixture proximate to the first end of the receptable body thereby forming a vacuum plasma implosion in the receptacle body thereby generating power.

13. The method of claim 12, further comprising:
producing a vacuum state in the receptacle body prior to formation of the plasma state by producing a vortex in the receptacle body after ignition, the vortex flowing from the second end of the receptacle body to the first end of the receptable body.

14. The method of claim 12 wherein the fuel becomes ionized wherein the vacuum state ionizes the fuel.

15. The method of claim 12 wherein the power generated is used by an electric power plant.

\* \* \* \* \*